(12) United States Patent
Jervis et al.

(10) Patent No.: US 9,122,446 B2
(45) Date of Patent: Sep. 1, 2015

(54) ANTENNA STRUCTURES IN ELECTRONIC DEVICES WITH HINGED ENCLOSURES

(75) Inventors: James W. Jervis, Santa Clara, CA (US); Jayesh Nath, Milpitas, CA (US); Erdinc Irci, Sunnyvale, CA (US); Jerzy Guterman, Mountain View, CA (US); Mattia Pascolini, Campbell, CA (US); Robert W. Schlub, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 13/484,040

(22) Filed: May 30, 2012

(65) Prior Publication Data

US 2013/0321216 A1 Dec. 5, 2013

(51) Int. Cl.
*G06F 1/16* (2006.01)
*H01Q 1/22* (2006.01)
*H01Q 1/38* (2006.01)
*H01Q 1/42* (2006.01)
*H04M 1/02* (2006.01)

(52) U.S. Cl.
CPC ............ *G06F 1/1616* (2013.01); *H01Q 1/2266* (2013.01); *H01Q 1/2291* (2013.01); *H01Q 1/38* (2013.01); *H01Q 1/42* (2013.01); *H04M 1/0216* (2013.01)

(58) Field of Classification Search
CPC ....... H01Q 1/243; H01Q 1/2266; H01Q 1/42; H01Q 1/38; G06F 1/1616; H04M 1/0216
USPC .............................. 343/702; 455/575.1–575.7
See application file for complete search history.

(56) References Cited

U.S. PATENT DOCUMENTS

| | | | |
|---|---|---|---|
| 6,272,356 B1 * | 8/2001 | Dolman et al. | 455/575.3 |
| 6,414,643 B2 * | 7/2002 | Cheng et al. | 343/702 |
| 6,697,022 B2 * | 2/2004 | Ponce De Leon et al. | 343/702 |
| 6,885,880 B1 | 4/2005 | Ali | |
| 7,209,084 B2 * | 4/2007 | Lindell | 343/702 |
| 7,286,089 B2 | 10/2007 | Lee et al. | |
| 7,310,536 B2 * | 12/2007 | Desclos et al. | 455/550.1 |
| 7,447,530 B2 * | 11/2008 | Iwai et al. | 455/575.7 |

(Continued)

FOREIGN PATENT DOCUMENTS

| | | |
|---|---|---|
| CN | 1691700 A | 11/2005 |
| CN | 101561699 A | 10/2009 |

(Continued)

*Primary Examiner* — Dameon E Levi
*Assistant Examiner* — Hasan Islam
(74) *Attorney, Agent, or Firm* — Treyz Law Group; Joseph F. Guihan

(57) ABSTRACT

Electronic devices may include radio-frequency transceiver circuitry and antenna structures. The antenna structures may include antenna resonating elements, parasitic antenna resonating elements, and antenna ground structures. The antenna structures may include metal traces that are wrapped around an elongated plastic carrier. The plastic carrier may have metal traces that are coupled to a metal bracket using solder that protrudes through a hole in the metal bracket. A printed circuit board may be mounted between the metal bracket and a metal housing. The metal housing may have a protruding ridge portion that is gripped between prongs on the metal bracket. A cover may cover the metal traces on the elongated plastic carrier. The antenna structures may be mounted between hinge structures that couple upper and lower housing structures. The antenna structures may be configured to operate with comparable performance when the upper and lower housing structures are open and closed.

23 Claims, 13 Drawing Sheets

(56) References Cited

U.S. PATENT DOCUMENTS

| | | | |
|---|---|---|---|
| 7,764,236 B2* | 7/2010 | Hill et al. | 343/702 |
| 8,264,412 B2 | 9/2012 | Ayala et al. | |
| 2003/0045246 A1 | 3/2003 | Lee et al. | |
| 2003/0234743 A1 | 12/2003 | Ponce De Leon et al. | |
| 2004/0104023 A1 | 6/2004 | Stark et al. | |
| 2004/0160370 A1* | 8/2004 | Ghosh et al. | 343/702 |
| 2004/0204023 A1 | 10/2004 | Desclos et al. | |
| 2005/0231431 A1* | 10/2005 | Pan | 343/702 |
| 2006/0092084 A1* | 5/2006 | Sakurai | 343/702 |
| 2007/0115185 A1* | 5/2007 | Ying et al. | 343/702 |
| 2008/0100514 A1 | 5/2008 | Abdul-Gaffoor et al. | |
| 2008/0100712 A1 | 5/2008 | Hayes et al. | |
| 2009/0128424 A1* | 5/2009 | Suzuki et al. | 455/575.3 |
| 2009/0149231 A1* | 6/2009 | Sato | 455/575.7 |
| 2009/0262029 A1 | 10/2009 | Chiang et al. | |
| 2009/0323652 A1 | 12/2009 | Chen et al. | |
| 2010/0009728 A1* | 1/2010 | Koshi et al. | 455/575.3 |
| 2010/0259452 A1* | 10/2010 | Kondo et al. | 343/702 |
| 2010/0321253 A1 | 12/2010 | Ayala Vazquez et al. | |
| 2011/0193751 A1 | 8/2011 | Golko et al. | |

FOREIGN PATENT DOCUMENTS

| | | |
|---|---|---|
| EP | 1292042 | 3/2003 |
| EP | 1653714 | 5/2006 |
| EP | 2110882 | 10/2009 |
| JP | 2001326524 | 11/2001 |
| JP | 3476138 B2 | 12/2003 |
| JP | 2010287980 | 12/2010 |

* cited by examiner

US 9,122,446 B2

ANTENNA STRUCTURES IN ELECTRONIC DEVICES WITH HINGED ENCLOSURES

BACKGROUND

This relates to wireless electronic devices, and, more particularly, to antenna structures for wireless electronic devices.

Electronic devices such as computers and handheld electronic devices are often provided with wireless communications capabilities. For example, electronic devices may use cellular telephone circuitry to communicate using cellular telephone bands. Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz.

To satisfy consumer demand for small form factor wireless devices, manufacturers are continually striving to implement wireless communications circuitry such as antenna components using compact structures. For example, antennas have been installed within the clutch barrel portion of portable computer housings. A portable computer clutch barrel contains hinges that allow the lid of the portable computer to open and close. In computers in which antennas have been mounted in the clutch barrel, the outer surface of the clutch barrel has been formed from plastic. The plastic is transparent at radio frequencies, so the antennas in the clutch barrel and transmit and receive radio-frequency antenna signals.

If care is not taken, however, antennas that are mounted in this way may exhibit performance variations as the lid of the computer is open and closed, may be subject to undesired losses, or may otherwise not exhibit satisfactory performance.

It would therefore be desirable to be able to provide improved ways in which to provide electronic devices such as portable computers with antennas.

SUMMARY

Electronic devices may include radio-frequency transceiver circuitry and antenna structures. The antenna structures may include antenna resonating elements, parasitic antenna resonating elements, and antenna ground structures.

An electronic device may have metal housing structures. The metal housing structures may include an upper housing structure such as a metal lid that includes a display and may include a lower housing structure such as a metal base that includes a keyboard and track pad. The metal lid and metal base may be coupled by hinge structures that allow the lid to rotate about a rotational axis relative to the base.

The antenna structures may include metal traces that extend around the surfaces of an elongated plastic carrier. The plastic carrier may be mounted parallel to the rotational axis. Metal traces on the plastic carrier may be coupled to a metal bracket using solder that protrudes through a hole in the metal bracket. A printed circuit board may be mounted between the metal bracket and a metal housing structure such as a portion of the metal lid. The metal lid may have a protruding ridge portion that is gripped between prongs on the metal bracket. A cover may cover the metal traces on the elongated plastic carrier.

Further features of the invention, its nature and various advantages will be more apparent from the accompanying drawings and the following detailed description of the preferred embodiments.

DETAILED DESCRIPTION

Figure 1:
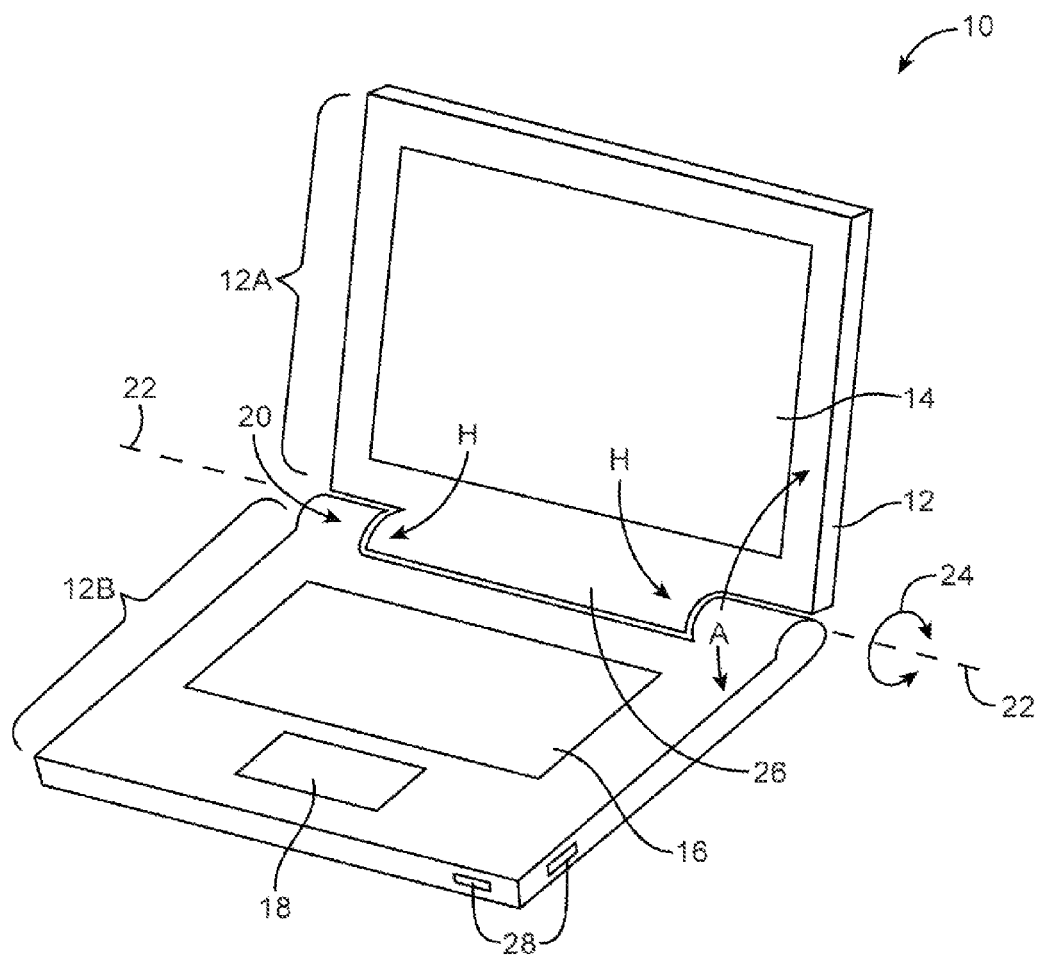
FIG. 1 is a perspective view of an illustrative electronic device in accordance with an embodiment of the present invention.

An electronic device such as electronic device 10 of FIG. 1 may contain wireless circuitry. For example, electronic device 10 may contain wireless communications circuitry that operates in long-range communications bands such as cellular telephone bands and wireless circuitry that operates in short-range communications bands such as the 2.4 GHz Bluetooth® band and the 2.4 GHz and 5 GHz WiFi® wireless local area network bands (sometimes referred to as IEEE 802.11 bands).

Device 10 may be a handheld electronic device such as a cellular telephone, media player, gaming device, or other device, may be a laptop computer, tablet computer, or other portable computer, may be a desktop computer, may be a television or set top box, or may be other electronic equipment. Configurations in which device 10 has a rotatable lid are sometimes described herein as an example. This is, however, merely illustrative. Device 10 may be any suitable electronic equipment.

As shown in the example of FIG. 1, device 10 may have a housing such as housing 12. Housing 12 may be formed from plastic, metal (e.g., aluminum), fiber composites such as carbon fiber, glass, ceramic, other materials, and combinations of these materials. Housing 12 or parts of housing 12 may be formed using a unibody construction in which housing structures are formed from an integrated piece of material. Multi-part housing constructions may also be used in which housing 12 or parts of housing 12 are formed from frame structures, housing walls, and other components that are attached to each other using fasteners, adhesive, and other attachment mechanisms.

Some of the structures in housing 12 may be conductive. For example, metal parts of housing 12 such as metal housing walls may be conductive. Other parts of housing 12 may be formed from dielectric material such as plastic, glass, ceramic, non-conducting composites, etc. To ensure that antenna structures in device 10 function properly, care should be taken when placing the antenna structures relative to the conductive portions of housing 12. If desired, portions of housing 12 may form part of the antenna structures for device 10. For example, conductive housing structures such as the walls or other parts of a metal housing may form an antenna ground.

As shown in FIG. 1, device 10 may have input-output devices such as track pad 18 and keyboard 16. A camera may be used to gather image data. Device 10 may also have components such as microphones, speakers, buttons, removable storage drives, status indicator lights, buzzers, sensors, and other input-output devices. These devices may be used to gather input for device 10 and may be used to supply a user of device 10 with output. Ports in device 10 such as ports 28 may receive mating connectors (e.g., an audio plug, a connector associated with a data cable such as a Universal Serial Bus cable, a data cable that handles video and audio data such as a cable that connects device 10 to a computer display, television, or other monitor, etc.).

Device 10 may include a display such a display 14. Display 14 may be a liquid crystal display (LCD), a plasma display, an organic light-emitting diode (OLED) display, a display having electrophoretic display pixels, a display having electrowetting display pixels, or a display implemented using other display technologies. A touch sensor may be incorporated into display 14 (i.e., display 14 may be a touch screen display) or display 14 may be insensitive to touch. Touch sensors for display 14 may be resistive touch sensors, capacitive touch sensors, acoustic touch sensors, light-based touch sensors, force sensors, or touch sensors implemented using other touch technologies.

Device 10 may have a one-piece housing or a multi-piece housing. As shown in FIG. 1, for example, electronic device 10 may be a device such as a portable computer or other device that has a two-part housing formed from upper housing 12A and lower housing 12B. Upper housing 12A may include display 14 and may sometimes be referred to as a display housing or lid. Lower housing 12B may sometimes be referred to as a base or main housing. Housings 12A and 12B may be connected to each other using a hinge (e.g., a hinge located in region 20 along the upper edge of lower housing 12B and the lower edge of upper housing 12A). Portion 26, which may sometimes be referred to as a clutch barrel, may extend between two hinges H located along axis 22.

The hinge structures in device 10 may allow upper housing 12A to rotate about axis 22 in directions 24 relative to lower housing 12B. The plane of lid (upper housing) 12A and the plane of lower housing 12B may be separated by an angle A that varies between 0° when the lid is closed to 90° or more (e.g., 100° or more, 120° or more, 135° or more, etc.) when the lid is opened. In a typical configuration, lid 12A may be located at an angle A of about 95-150°, 95-120°, 95-130°, 90-120°, 90-150°, 90-130°, or about 100-135° relative to housing 12B during operation of device 10 by a user.

Figure 2:
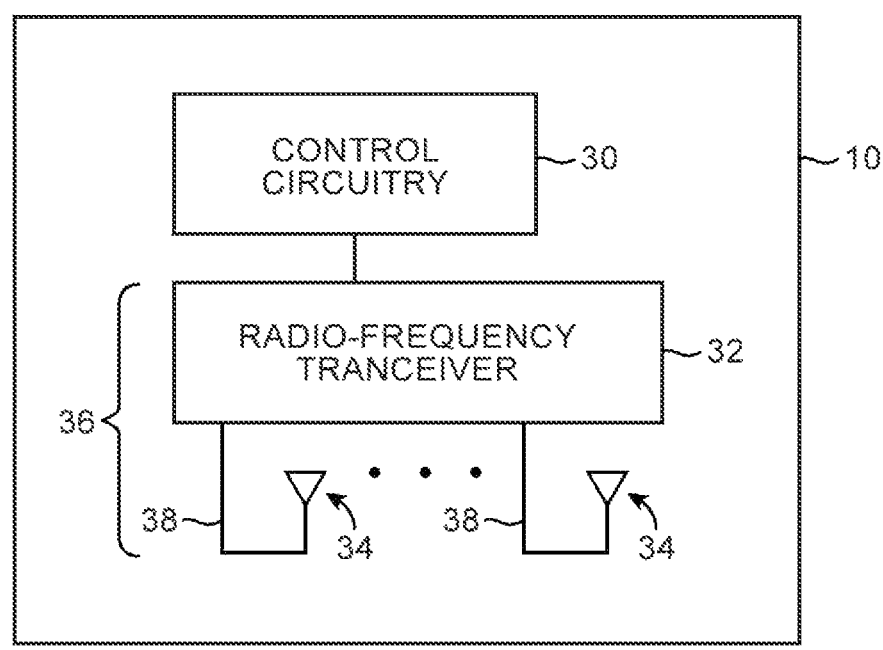
FIG. 2 is a schematic diagram of an illustrative electronic device with wireless circuitry that includes antenna structures and transceiver circuitry in accordance with an embodiment of the present invention.

As shown in FIG. 2, device 10 may include control circuitry 30. Control circuitry 30 may include storage such as flash memory, hard disk drive memory, solid state storage devices, other nonvolatile memory, random-access memory and other volatile memory, etc. Control circuitry 30 may also include processing circuitry. The processing circuitry of control circuitry 30 may include digital signal processors, microcontrollers, application specific integrated circuits, microprocessors, power management unit (PMU) circuits, and processing circuitry that is part of other types of integrated circuits.

Wireless circuitry 36 may be used to transmit and receive radio-frequency signals. Wireless circuitry 36 may include wireless radio-frequency transceiver 32 and one or more antennas 34 (sometimes referred to herein as antenna structures). Wireless transceiver 32 may transmit and receive radio-frequency signals from device 10 using antenna structures 34. Circuitry 36 may be used to handle one or more communications bands. Examples of communications bands that may be handled by circuitry 36 include cellular telephone bands, satellite navigation bands (e.g., the Global Positioning System band at 1575 MHz), bands for short range links such as the Bluetooth® band at 2.4 GHz and wireless local area network (WLAN) bands such as the IEEE 802.11 band at 2.4 GHz and the IEEE 802.11 band at 5 GHz, etc.

When more than one antenna is used in device 10, radio-frequency transceiver circuitry 32 can use the antennas to implement multiple-input and multiple-output (MIMO) protocols (e.g., protocols associated with IEEE 802.11(n) networks) and antenna diversity schemes. Multiplexing arrangements can be used to allow different types of traffic to be transmitted and received over a common antenna structure. For example, transceiver 32 may transmit and receive both 2.4 GHz Bluetooth® signals and 802.11 signals over a shared antenna.

Transmission line paths such as path 38 may be used to couple antenna structures 34 to transceiver 32. Transmission lines in path 38 may include coaxial cable paths, microstrip transmission lines, stripline transmission lines, edge-coupled microstrip transmission lines, edge-coupled stripline transmission lines, transmission lines formed from combinations of transmission lines of these types, etc.

During operation, antennas 34 may receive incoming radio-frequency signals that are routed to radio-frequency transceiver circuitry 32 by paths 38. During signal transmission operations, radio-frequency transceiver circuitry 32 may transmit radio-frequency signals that are conveyed by paths 38 to antenna structures 34 and transmitted to remote receivers.

Hinges H may be used to allow portions of an electronic device to rotate relative to each other. Hinges in device 10 may, for example, be used to allow upper housing 12A of FIG. 1 to rotate relative to lower housing 12B about rotational axis 22. The hinge structures that are used to attach housings 12A and 12B together are sometimes referred to as clutch structures or clutches. If desired, antenna structures 34 (e.g., one antenna, an array of two or more antennas, or an array of three or more antennas) may be formed using structures that are located in clutch barrel portion 26 of housing 12 between respective hinges H.

Figure 3:
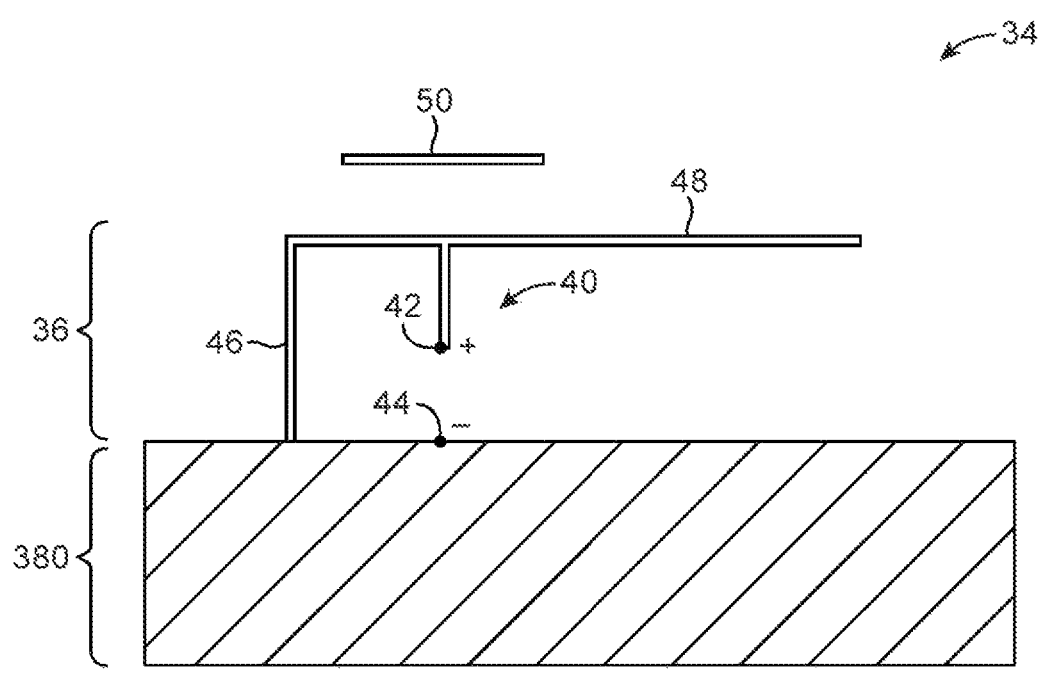
FIG. 3 is a diagram of an illustrative antenna in accordance with an embodiment of the present invention.

An illustrative configuration that may be used for an antenna in device 10 is shown in FIG. 3. In general, antennas 34 may be based on patch antennas, loop antennas, planar inverted-F antennas, monopoles, dipoles, inverted-F antennas, or other types of antenna. In the illustrative configuration of FIG. 3, antenna 34 has been formed using an inverted-F antenna design. This is, however, merely illustrative. Antennas 34 in device 10 may be based on any suitable type of antenna, if desired.

As shown in FIG. 3, antenna 34 may have an antenna resonating element such as antenna resonating element 36 and an antenna ground such as antenna ground 380. Antenna resonating element 36 may have conductive structures such as main resonating element arm 48. Arm 48 may contain one or more bends or branches, if desired. The configuration of FIG. 3 is merely illustrative. A short circuit branch such as branch 46 may be used to couple resonating element arm 48 to antenna ground 380. A transmission line such as one of transmission lines 38 of FIG. 2 may have a positive conductor that is coupled to positive antenna feed terminal 42 in antenna feed 40 and may have a ground conductor that is coupled to ground antenna feed terminal 44 in antenna feed 40. Antenna 34 may include one or more parasitic antenna elements such as parasitic antenna element 50. Parasitic antenna elements such as element 50 may be electromagnetically coupled to antenna 34 and may help tune antenna performance, but are not directly fed by an antenna feed such as antenna feed 40.

The conductive structures that make up antennas such as antenna 34 in device 10 may be formed from metal traces on substrates such as printed circuits (e.g., rigid printed circuit boards or flexible printed circuits formed from sheets of polyimide or other flexible polymer layers), plastic carriers, or other dielectric support structures. Conductive structures in device 10 such as metal brackets, other patterned metal parts, internal housing structures such as sheet metal structures, metal housing walls, and other housing structures and conductive structures in device 10 may also form all or part of antenna ground and/or other portions of antenna 34.

The performance of antennas that are formed in device 10 may be affected by the proximity of conductive housing structures and other conductive device components to metal traces in antenna resonating element 36 and/or metal traces associated with parasitic antenna elements such as parasitic antenna element 50. For example, the metal traces that form resonating element 36 and parasitic element 50 may become capacitively coupled to adjacent metal housing structures. Variations in the amount of capacitive coupling between antenna structures such as these and the adjacent metal housing structures as a function of lid position have the potential to affect antenna performance. Preferably, device 10 and antennas 34 are configured so that satisfactory antenna performance is obtained for a variety of different lid positions (e.g., in a fully closed position, in a normal open position, and in potentially other lid positions).

Figure 4:
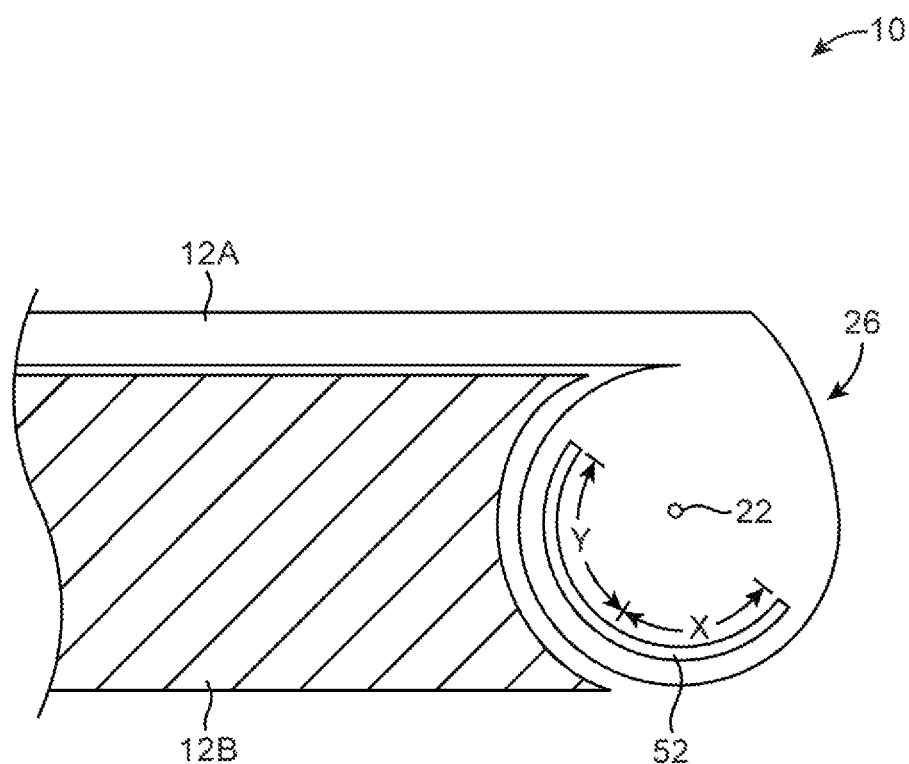
FIG. 4 is a cross-sectional side view of an antenna in an electronic device such as a portable computer with a closed lid in accordance with an embodiment of the present invention.

A schematic diagram of antenna 34 in clutch barrel 26 of device 10 when upper housing portion (lid) 12A is in a closed position with respect to lower housing portion (base) 12B is shown in FIG. 4. As shown in FIG. 4, antenna 34 may include conductive structures 52 (e.g., resonating element traces, parasitic element traces, etc.). During operation in the closed lid position of FIG. 4, portion Y of structures 52 may overlap housing 12B and may exhibit capacitive coupling with housing 12B, whereas portion X may be exposed to the surrounding environment and may therefore not be capacitively coupled to housing 12B.

Figure 5:
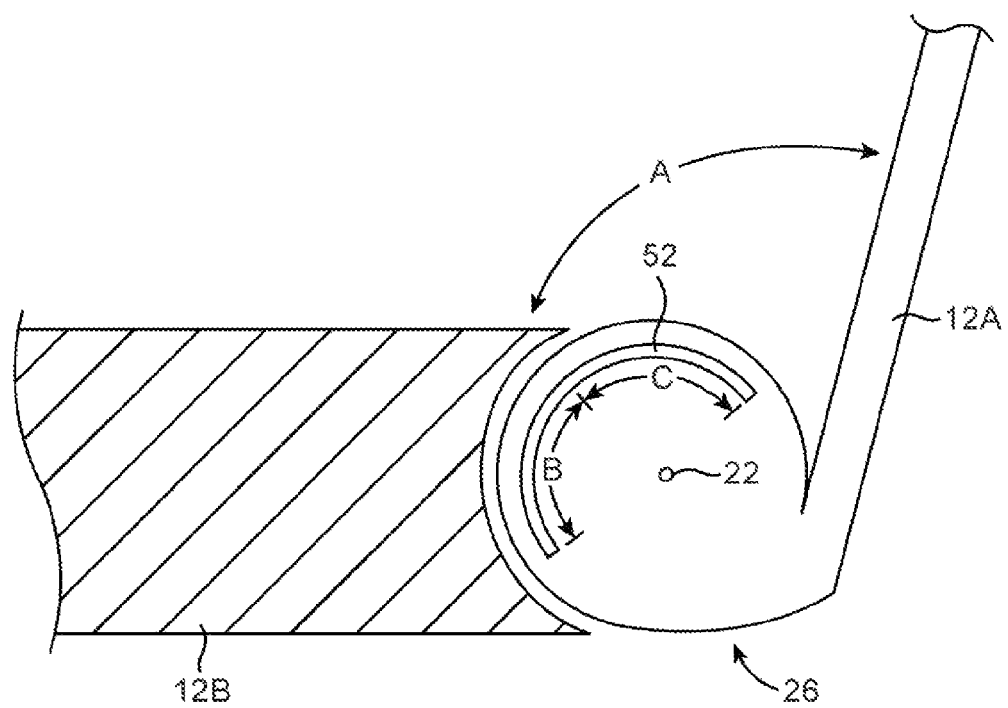
FIG. 5 is a cross-sectional side view of an antenna in an electronic device such as a portable computer with an open lid in accordance with an embodiment of the present invention.

The amount of capacitive coupling that is exhibited between conductive antenna structures 52 and housing 12B may vary as a function of lid angle A. In the configuration of FIG. 4, angle A is 0°. When a user opens lid 12A (e.g., to an angle A of about 90° to 150°) as shown in FIG. 5, portion B of conductive antenna structures 52 may overlap housing 12B and may be capacitively coupled to housing 12B, whereas portion C of conductive antenna structures 52 may be exposed and therefore not capacitively coupled to housing 12B.

Variations in capacitive coupling between antenna structures 52 and housing 12B (which may serve as part of the antenna ground for antenna 34) may affect antenna performance. In the closed configuration of FIG. 4, the amount of coupling is related to overlap amount Y. In the open configuration of FIG. 5, the amount of coupling is related to overlap amount B. Different coupling levels may tend to detune antenna 34 and therefore have a potential to disrupt proper antenna operation. To ensure that antenna performance does not vary too much between closed and open lid positions, conductive structure 52 can be configured so that capacitive coupling is within satisfactory limits in both the closed position of FIG. 4 and the open position of FIG. 5.

Figure 6A:
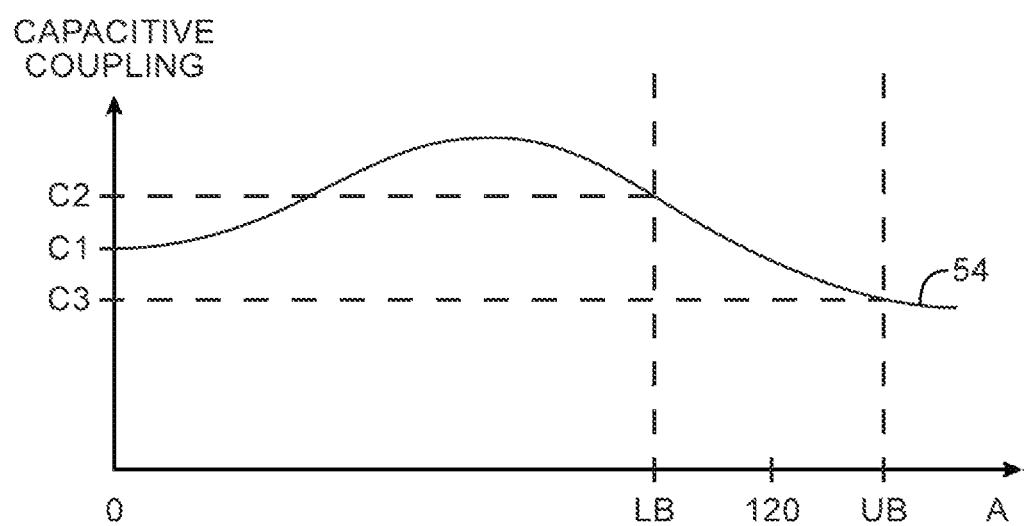
FIG. 6A is a graph showing how capacitive coupling between antenna structures and conductive device housing structures may vary as a function of lid angle in accordance with an embodiment of the present invention.

As an example, antenna 34 can be configured so that the amount of capacitive coupling between structures 52 (e.g., resonating element 36 and parasitic element 50) and housing 12B varies in accordance with a characteristic such as curve 54 of FIG. 6A. As shown in the FIG. 6A example, the amount of capacitive coupling that is exhibited may vary as a function of lid angle A. When A is equal to zero (i.e., when lid 12 A is closed as shown in FIG. 4), the amount of capacitive coupling may be C1. When A is in the normal range of angles A (i.e., when A is between a lower bound LB of 90° and an upper bound UB of 150°, between a lower bound LB of 90° and an upper bound UB of 130°, between an LB value of 95° and a UB value of 120°, between an LB value of 95° and a UB value of 130°, between a lower bound LB value in the range of 40-100° and an upper bound of 80-160°, or when A lies within other ranges extending from lower bound LB to upper bound UB), the amount of capacitive coupling may range between C2 and C3. To ensure satisfactory operation (and minimized antenna detuning) when operating lid 12A in an open position (angle A between LB to UB) of the type shown in FIG. 12B, antenna structures 52 may be configured so that C2 and C3 are within 50% of C1, within 40% of C1, within 30% of C1, within 15% of C1, or within 5% of C1 when A is between these normal LB and UB values (as examples).

Figure 6B:
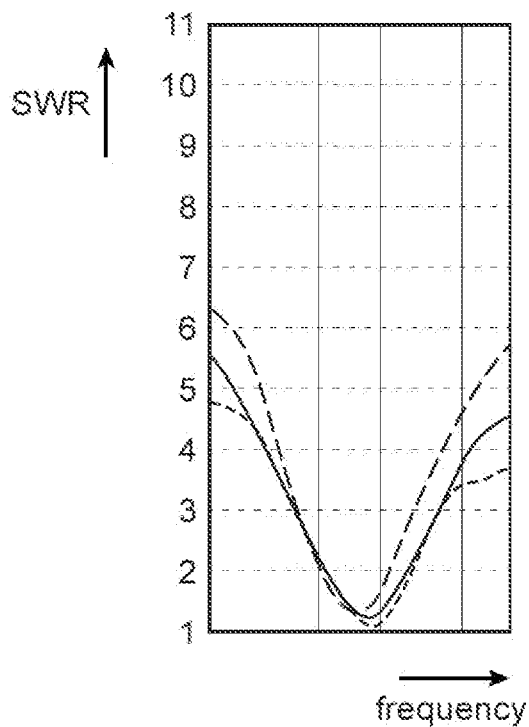
FIG. 6B is a graph in which antenna performance (standing wave ratio) has been plotted as a function of operating frequency in a communications band of interest for three different clutch barrel antennas when a device is operated in an open lid configuration in accordance with an embodiment of the present invention.

FIG. 6B is a graph in which antenna performance (standing wave ratio) for antenna structures that have been configured in this way has been plotted as a function of operating frequency in a communications band of interest (e.g., 2.4 GHz, 5 GHz, cellular telephone bands, etc.) for three different clutch barrel antennas when device 10 is operated in an open lid configuration.

Figure 6C:
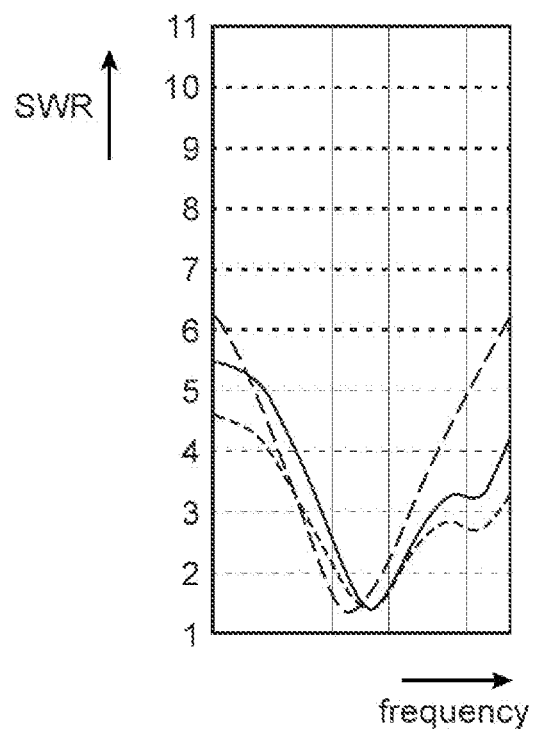
FIG. 6C is a graph in which antenna performance (standing wave ratio) has been plotted as a function of operating frequency in a communications band of interest for the three different clutch barrel antennas of FIG. 6B when the device is operated in a closed lid configuration in accordance with an embodiment of the present invention.

FIG. 6C is a graph in which antenna performance (standing wave ratio) has been plotted as a function of operating frequency in the communications band of interest for the three different clutch barrel antennas of FIG. 6B when the same device is operated in a closed lid configuration. As shown by comparing the graphs of FIGS. 6B and 6C, antenna performance (particularly in the middle of the plotted range corresponding to operating frequencies of interest) is comparable, regardless of whether device 10 is operated in the open lid or closed lid configuration.

Figure 7:
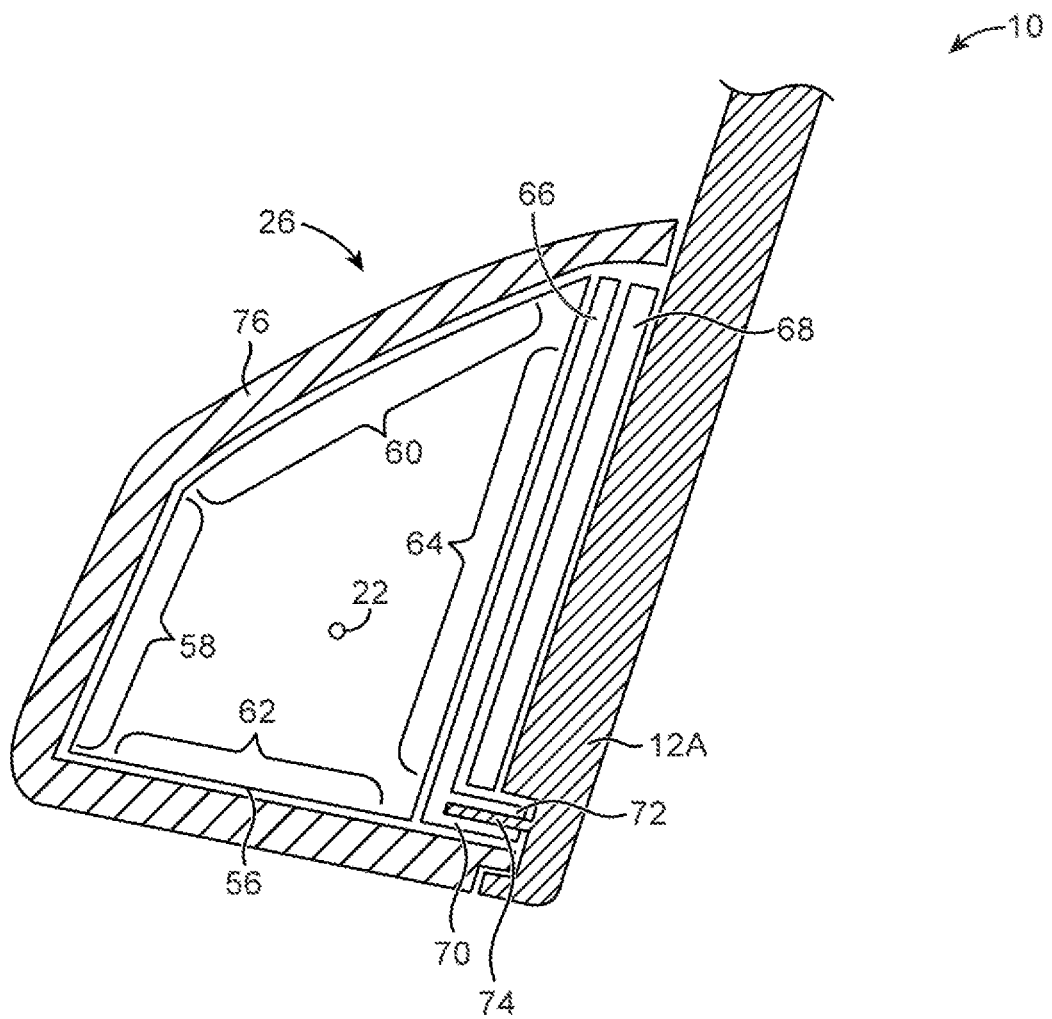
FIG. 7 is a cross-sectional side view of an illustrative electronic device antenna in accordance with an embodiment of the present invention.

A cross-sectional side view of an illustrative clutch barrel portion of housing 12A is shown in FIG. 7. As shown in FIG. 7, antenna traces for antenna 32 may be formed on a dielectric carrier such as dielectric carrier 56. Carrier 56 may be, for example, an injection-molded plastic member having an elongated shape that extends parallel to rotational axis 22. Conductive antenna structures may be formed on the surfaces of carrier 56. For example, antenna resonating element traces and parasitic element traces may be formed on surfaces such as surfaces 58, 60, and 62 and antenna ground traces may be formed on surface 64. Metal bracket 66 may be coupled to the antenna ground traces on surface 64 and may form part of an antenna ground for antenna 32.

As shown in FIG. 7, metal bracket 66 may have portions such as prongs 70 and 72 that are configured to grip protruding rib portion 74 of metal housing 12A, thereby grounding bracket 66 to metal housing 12A. Printed circuit board 68 may be used for mounting components such as transceiver circuitry 32 (FIG. 2) and may be attached to bracket 66 (e.g., using adhesive, screws, or other fastening mechanisms). Plastic cover structure 76 may be used to cover the components of FIG. 7.

Figure 8:
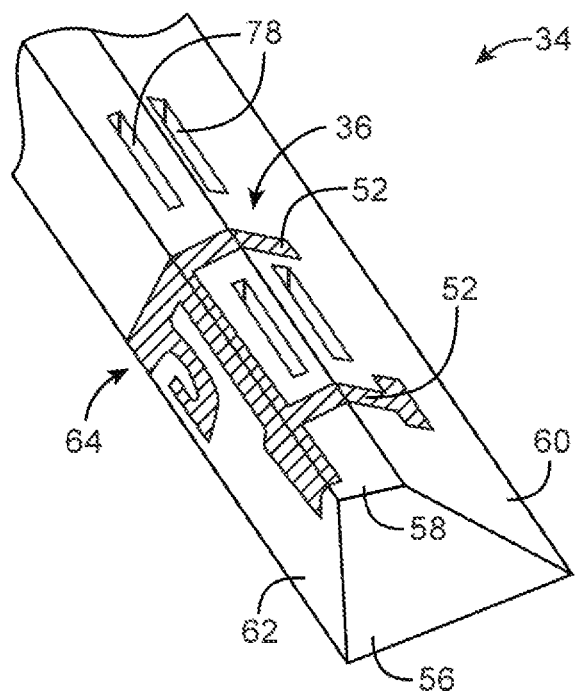
FIGS. 8 and 9 are perspective views of portions of a dielectric antenna carrier with antenna traces in accordance with an embodiment of the present invention.

FIG. 8 is a perspective view of an illustrative antenna carrier of the type that may be used in forming one or more antennas 34. As shown in FIG. 8, conductive structures 52 (e.g., metal traces for forming antenna resonating element 36) may be formed on surfaces such as surfaces 62, 58, and 60 of carrier 56. Some of the traces may extend onto surface 64 of carrier 56 (e.g., to form ground connections to bracket 66). Carrier 56 may include openings such as open-faced slot-shaped cavities 78 (e.g., air-filled slots or holes of other shapes). Cavities 78 may facilitate injection molding of a satisfactory plastic part for carrier 56 by preventing undesired voids and sink marks that might otherwise arise during injection molding operations when plastic in the mold does not flow properly.

Figure 9:
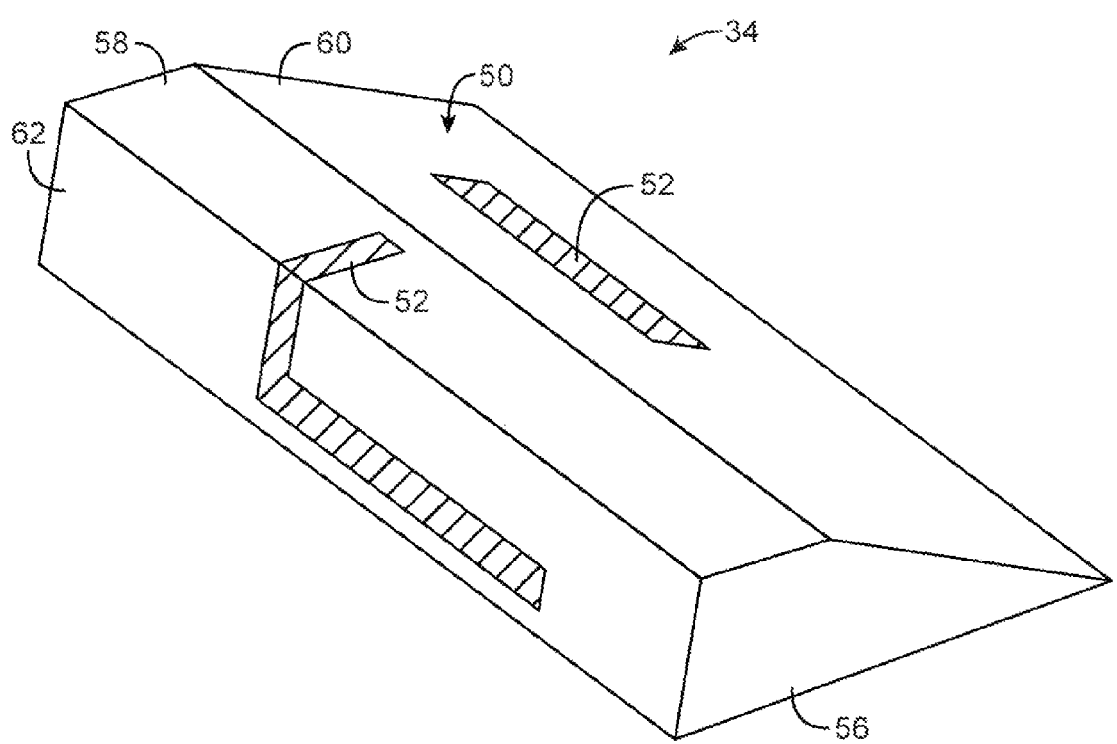

As shown in FIG. 9, metal traces on the surface of plastic antenna carrier 56 such as conductive structures 52 of FIG. 9 may be configured to form one or more parasitic elements such as parasitic antenna resonating element 50.

Figure 10:
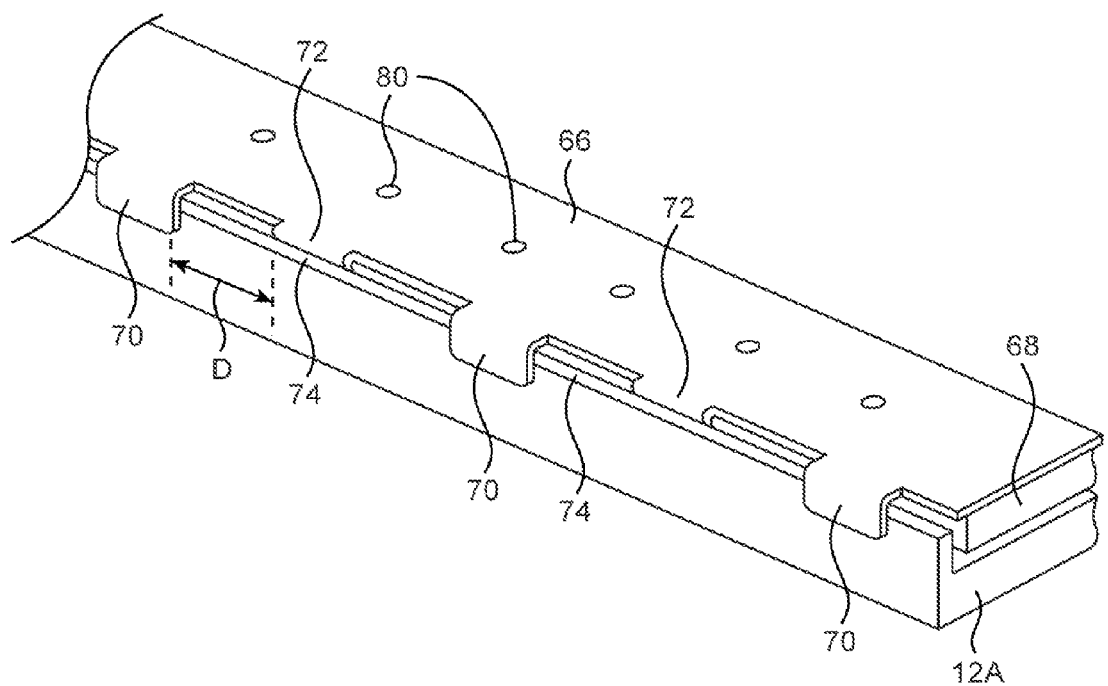
FIG. 10 is a perspective view of a metal antenna ground bracket coupled to a conductive device housing and supporting a printed circuit board in accordance with an embodiment of the present invention.

FIG. 10 is a perspective view of bracket 66 showing how bracket 66 may be used in mounting printed circuit board 68 in housing 12A. As shown in FIG. 10, prongs 70 and 72 may be longitudinally spaced by a distance D. The value of distance D is preferably less than a quarter of a wavelength at operating frequencies of interest, so that bracket 66 may serve as a ground plane element for antenna 34 without introducing unwanted resonance peaks into the antenna response.

Bracket 66 may be formed from a metal such as stainless steel or other metals. Bracket 66 may, as an example, be a strip of sheet metal that has been stamped or otherwise processed to form features such as openings 80 and prongs 74 and 74. Openings 80 may be used to receive screws, solder, heat stakes, or other components.

Figure 11:
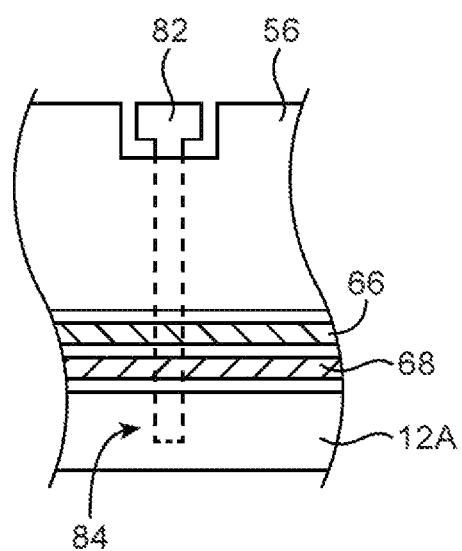
FIG. 11 is a cross-sectional side view of a portion of an electronic device antenna structure showing how a screw may be used to attach an antenna carrier, printed circuit board, and antenna ground bracket to a metal electronic device housing in accordance with an embodiment of the present invention.

FIG. 11 is a cross-sectional side view of carrier 56 showing how screws such as screw 82 may pass through openings in carrier 56, bracket 66, and printed circuit board 66 before being received in threaded opening 84 of housing 12A. An arrangement of the type shown in FIG. 11 may be used to attach carrier 56, bracket 66, and printed circuit 68 to housing 12A.

Figure 12:
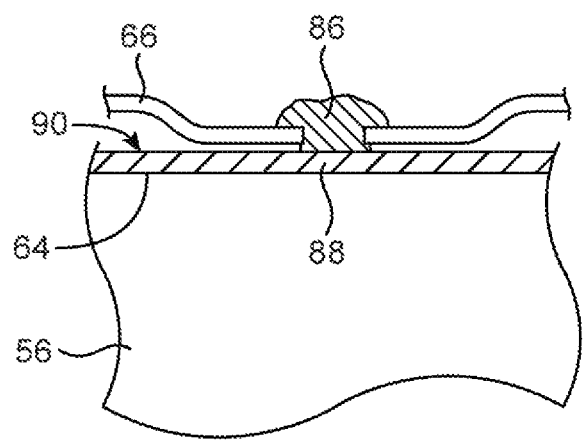
FIG. 12 is a cross-sectional side view of an illustrative metal antenna ground bracket that has been coupled to antenna traces on a dielectric carrier using solder in accordance with an embodiment of the present invention.

Bracket 66 may be coupled to traces on carrier 56 using solder. As shown in FIG. 12, for example, bracket 66 may have an opening through which solder 86 may pass to form a connection to portion 88 of metal trace 90 on surface 64 of carrier 56. There may be numerous solder connections such as solder connection 86 for grounding bracket 66 to antenna ground trace such as trace 90. Solder 86 and optional heat stakes and screws passing through openings in bracket 66 may mechanically couple bracket 66 to carrier 56.

The foregoing is merely illustrative of the principles of this invention and various modifications can be made by those skilled in the art without departing from the scope and spirit of the invention.

What is claimed is:

1. An electronic device, comprising:
   a metal lid;
   a metal base to which the lid is attached for rotational motion about a rotational axis, wherein the metal base has first and second opposing surfaces;
   an elongated plastic carrier;
   a non-helical antenna that has metal traces at least partially wrapped around the elongated plastic carrier, a first portion of the metal traces that overlaps the base between the first and second opposing surfaces when the lid is in an open position relative to the base, and a second portion of the metal traces that overlaps the base between the first and second opposing surfaces when the lid is in a closed position relative to the base; and
   a fastening mechanism that passes through the elongated plastic carrier to secure the elongated plastic carrier to the metal lid.

2. The electronic device defined in claim 1 wherein the antenna comprises a capacitively coupled parasitic antenna resonating element.

3. The electronic device defined in claim 2 wherein the capacitively coupled parasitic antenna resonating element is formed from a portion of the metal traces.

4. The electronic device defined in claim 2 wherein the elongated plastic carrier comprises a plurality of slot-shaped cavities.

5. The electronic device defined in claim 1 further comprising a plastic cover that covers the antenna traces.

6. The electronic device defined in claim 1 wherein the metal lid and the metal base lie in respective planes that are separated by an angle, wherein the metal traces are configured to exhibit a first amount of capacitive coupling between the metal traces and the metal base when the angle is equal to zero and to exhibit a second amount of capacitive coupling between the metal traces and the metal base when the angle is greater than 90° and less than 130°, and wherein the first amount of capacitive coupling is within 50% of the second amount of capacitive coupling.

7. The electronic device defined in claim 6 further comprising a display mounted in the metal lid.

8. The electronic device defined in claim 7 further comprising a keyboard mounted in the metal base.

9. The electronic device defined in claim 1, further comprising a metal bracket that is electrically connected to at least one trace on the elongated plastic carrier and forms an antenna ground for the non-helical antenna.

10. The electronic device defined in claim 9, further comprising a printed circuit board adjacent to the metal bracket.

11. The electronic device defined in claim 10, wherein the fastening mechanism passes through respective openings in the elongated plastic carrier, metal bracket, and printed circuit board to secure the elongated plastic carrier, metal bracket, and printed circuit board to the metal lid.

12. The electronic device defined in claim 9, wherein the metal bracket has a planar surface that bears against a planar surface of the elongated plastic carrier.

13. The electronic device defined in claim 11 further comprising a display mounted in the metal lid.

14. The electronic device defined in claim 9 wherein the metal bracket comprises prongs.

15. The electronic device defined in claim 14 wherein the metal lid has a protruding rib portion and wherein the prongs are configured to grip the protruding rib portion.

16. An electronic device, comprising:
a first metal housing structure;
a display mounted in the first metal housing structure;
a second metal housing structure to which the first metal housing structure is coupled by hinge structures to allow the first metal housing structure to rotate about a rotational axis relative to the second metal housing structure;
an elongated plastic carrier that extends parallel to the rotational axis and that has a planar surface;
metal traces on the elongated plastic carrier; and
a planar metal bracket that is electrically attached to at least some of the metal traces and to the first metal housing structure and that bears against the planar surface of the elongated plastic carrier, wherein the metal bracket is configured to form an antenna ground for an antenna and wherein at least some of the metal traces are configured to form an antenna resonating element for the antenna.

17. The electronic device defined in claim 16 wherein the metal bracket has an opening, the electronic device further comprising solder that protrudes through the opening.

18. The electronic device defined in claim 16 wherein the metal bracket has an opening, the electronic device further comprising a screw that passes through the opening and into the first metal housing structure.

19. The electronic device defined in claim 18 further comprising a printed circuit board, wherein the printed circuit board has a hole through which the screw passes.

20. An electronic device, comprising:
first and second conductive housings coupled by hinge structures for rotational motion about a rotational axis, wherein the first and second conductive housings lie in planes that are separated by an angle; and
antenna structures that have metal traces that are formed entirely within the hinge structures, that only partially surround the rotational axis, and that are configured to exhibit a first amount of capacitive coupling when the angle is equal to zero and to exhibit a second amount of capacitive coupling when the angle is between 95° and 130°, wherein the first amount of capacitive coupling is within 50% of the second amount of capacitive coupling, the metal traces are located on an elongated plastic carrier with a planar surface, and the antenna structures include a strip of metal that forms an antenna ground and has a planar surface that bears against the planar surface of the elongated plastic carrier.

21. The electronic device defined in claim 20 wherein the metal traces form a parasitic antenna resonating element.

22. The electronic device defined in claim 21 wherein the metal traces include an antenna resonating element.

23. The electronic device defined in claim 22 wherein the strip of metal has a hole and is soldered to the metal traces with solder that extends through the hole.

\* \* \* \* \*